United States Patent [19]

Skunes et al.

[11] Patent Number: 5,293,048
[45] Date of Patent: Mar. 8, 1994

[54] LASER SENSOR FOR DETECTING THE PRESENCE OF AN OBJECT IN CONTINUOUS MOTION

[75] Inventors: Timothy A. Skunes, Columbia Heights; Steven K. Case, St. Louis Park, both of Minn.

[73] Assignee: CyberOptics Corporation, Minneapolis, Minn.

[21] Appl. No.: 968,261

[22] Filed: Oct. 30, 1992

Related U.S. Application Data

[63] Continuation of Ser. No. 636,272, Dec. 31, 1990, abandoned.

[51] Int. Cl.$^5$ ............................................. G01V 9/04
[52] U.S. Cl. ................................. 250/561; 250/214 RC
[58] Field of Search ............ 250/560, 561, 562, 206.3, 250/214 RC, 231.14; 356/387, 385, 372, 394, 386; 408/223, 230, 17, 10, 14; 364/559, 562, 563, 507, 508, 148; 73/655-657

[56] References Cited

U.S. PATENT DOCUMENTS

| | | | |
|---|---|---|---|
| 4,340,326 | 7/1982 | Buonauro et al. | 250/561 |
| 4,502,823 | 3/1985 | Wronski et al. | 250/561 |
| 4,507,834 | 4/1985 | Chen et al. | |
| 4,613,812 | 9/1986 | Gelston | 324/58.5 B |
| 4,654,523 | 3/1987 | Tanaka et al. | 250/231.14 |
| 4,657,395 | 4/1987 | Shiraishi | 356/385 |
| 4,667,113 | 5/1987 | Nakajima et al. | 250/561 |
| 4,678,337 | 7/1987 | Cohen et al. | 356/387 |
| 5,005,978 | 4/1991 | Skunes et al. | 356/372 |

FOREIGN PATENT DOCUMENTS 3434461  3/1986  Fed. Rep. of Germany .

OTHER PUBLICATIONS

Excellon Automation Broken Tool Detector Service Manual, 211012-17 Rev. B, Jun. 1985, pp. 6-1, 6-2 and 7-4.

Excellon Automation sales literature (date unknown).

*Primary Examiner*—David C. Nelms
*Assistant Examiner*—Que T. Le
*Attorney, Agent, or Firm*—Dorsey & Whitney

[57] ABSTRACT

A laser based noncontact detection system is disclosed which is useful in automated manufacturing. The sensor system detects the presence or absence of an object that is either rotating or in some other continuous repetitive motion such as a rotating drill bit. This device is especially useful for detecting broken or absent drill bits used for drilling printed circuit boards. The system projects a laser beam onto the concave face of the flute near the tip of a drill bit and the amount of light which is reflected by the drill bit is sensed by a detector. The sensor is located at an angle oblique to the axis of rotation. Due to the rotation of the drill bit, fluctuating electronic signals are produced, detected and analyzed to determine the presence of the drill bit. The system automatically compensates for dust, debris and ambient light. Sensor positioning allows for greater drilling machine throughput since there is no need to fully retract the drill bit for breakage or damage detection. The laser beam may be focused into a stripe of light allowing for the detection of rotating drills of differing diameters without refocusing the light source when the sensor is used on a drilling machine using different and interchangeable drill sizes. The system can be used for detecting any continuously revolving object or any object in any other continuous repetitive motion. The presence of the object may be verified after each repetitive motion sequence.

36 Claims, 4 Drawing Sheets

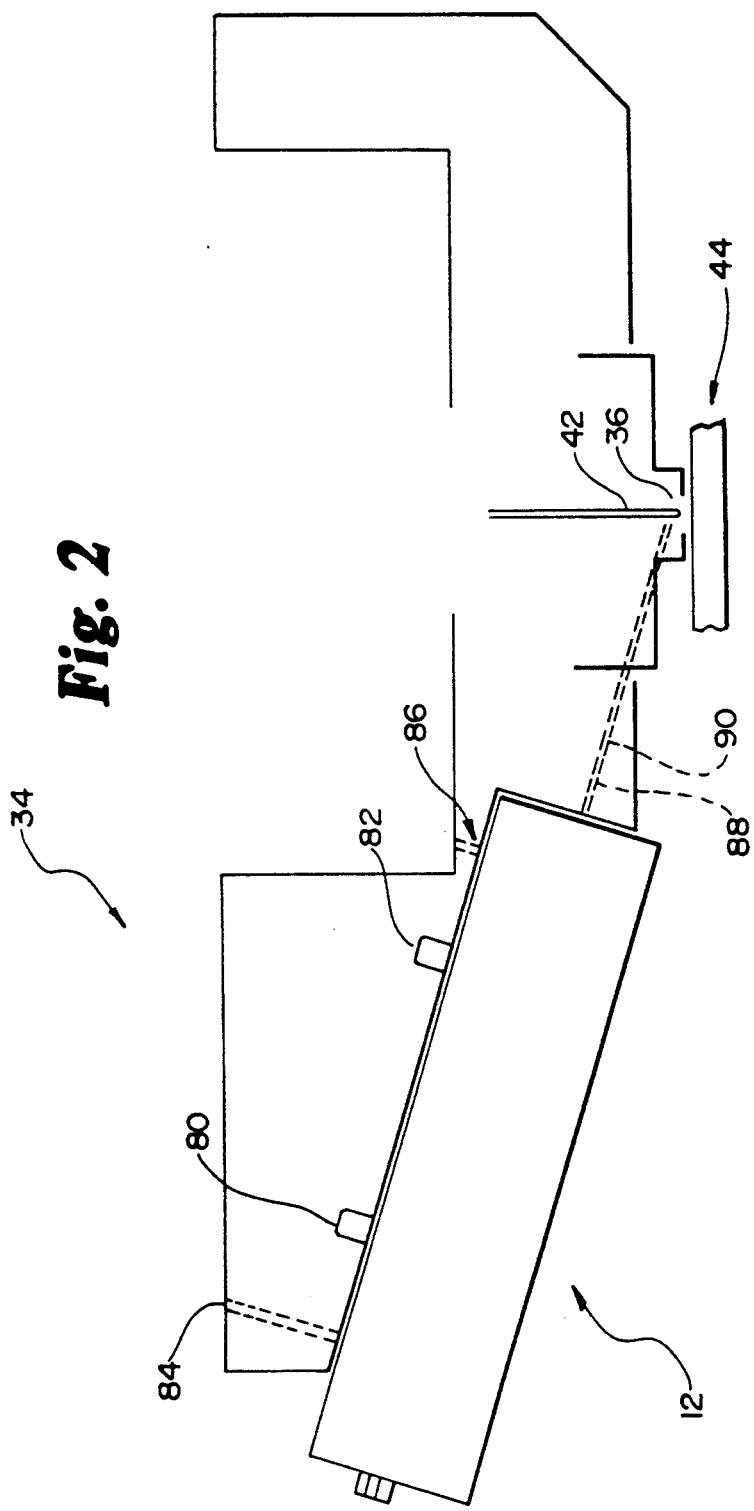

LASER SENSOR FOR DETECTING THE PRESENCE OF AN OBJECT IN CONTINUOUS MOTION

This application is a continuation of application Ser. No. 07/636,272, filed Dec. 31, 1990, abandoned.

BACKGROUND OF THE INVENTION

1. Field of the Invention

The invention relates to industrial type noncontact detection systems for ascertaining the presence of an object at a point in a machine system. More specifically, the invention relates to a laser based noncontact detection system for ascertaining the presence or absence of rotating objects or objects in some other continuous repetitive motion. Due to its ability to operate in harsh environments and accommodate different drill bit sizes, it is particularly useful to detect broken drill bits used in the automated routing and drilling of printed circuit boards and to determine whether the tips of such drill bits have been broken or damaged.

2. Description of the Prior Art

The creation of automated manufacturing has produced many benefits to mankind. For example, the manufacture of most consumer and industrial electronic instruments and appliances is largely automated. Electronic components are installed on circuit boards by pick and place machines. Holes for interconnecting circuits on the board, for fastening means and the like are also automatically drilled by high speed, computer driven drilling machines which rapidly position the board, hold it in position and drill the necessary holes.

Problems arise when a drill bit breaks during the drilling operation and goes undetected. If the broken drill is not detected, the drilling machine will attempt to continue drilling holes with the broken drill. If the drill breakage occurs only a small distance from the drill tip, the drilling machine will continue to drill with the damaged drill bit, which will destroy the board or, at best, produce very poor quality holes. This may require the defective circuit board to be discarded. If the drill breakage occurs at a greater distance from the drill tip, the resultant circuit board will lack subsequent holes which were to be created in the drilling process by the damaged drill bit. A defective board which lacks certain holes may be recognized during a post-inspection process and the missing holes may be drilled. However, this correction causes a significant reduction in productivity.

While noncontact detection systems have been available, conventional noncontact systems are typically highly affected by environmental conditions and are unable to be conveniently located on the drilling system. Noncontact detection systems of the past have been based on LED or microwave technology, both highly susceptible to environmental conditions. Prior, noncontact detection systems have not utilized the benefits of the continuous repetitive movement of the object to eliminate error, interference and the effects of harsh changing environmental conditions.

Also, available detectors are required to be located very close to the object and at an angle normal to the objects motion. Generally, this is a poor location and subjects the detection device to difficult operating conditions. In a drilling machine operation, the traditional light detection systems must be placed in a ballistic path of the debris generated by the drill increasing interferences and device errors.

Past detection systems utilizing light occlusion require the object to be directly in the path of the light. On drilling systems, this necessitates the retraction of the drill bit beyond the pressure plate and fully into the pressure foot assembly. This full retraction after each drilled hole greatly decreases the efficiency of the drilling machine. Also such a system must detect small fractional signal changes, particularly for drills with smaller diameters.

Noncontact microwave detection systems operate on the principle that the presence of a continuous target, such as a fine drill, in or near the end of the waveguide at a predetermined location produces a change in the standing wave ratio (SWR) of the transmitted signal. This change in the SWR is capable of being detected by a receiver to provide a signal that is indicative of the target condition. The microwave systems do not operate like a doppler radar since only the D.C. output signal is utilized by the detection system. The frequency component of the output signal is not used by the comparator. The creation of a resonant microwave cavity and the detection of objects entering the cavity by a change in the standing wave ratio is effected by nearly any foreign object entering the resonant cavity. Thus, the system is prone to interference from debris. The microwave detection systems are also subject to interference from the copper shavings produced during the drilling of the copper layers in printed circuit boards, known as "drill-wrap," and system to system variations.

The microwave system is sensitive to precisely the target that is being detected. Thus in drilling systems, the detection device must be recalibrated for each drill diameter. This can be highly inefficient for a drilling system which engages drill bits of varying diameters via an automatic changer.

All elements in or surrounding the microwave cavity must remain constant. The components making up the cavity can not be moved without making changes or adjustment to the microwave detection device. The microwave detection system is not easily adaptable from system to system and adjustments or variations may be needed depending on the objects in and around the cavity created by each host system.

The microwave detection systems produce small signal changes from the object-present state to the object-not-present state which are analyzed by the system's comparator. Using a small signal change greatly increases the possibility of error by the microwave system.

What has been needed is a robust system which is substantially immune to environmental conditions and host system designs, a system which is flexible as to location and object to be detected and which is quick and accurate. The present invention is designed to address these needs.

SUMMARY OF THE INVENTION

The noncontact laser detection system is a unique system which detects fluctuating light reflected from an object in motion. The invention is especially useful for detecting the presence or absence of a target in continuous repetitive motion at one point in its repetitive path of motion. This ability is particularly useful for detecting the presence or absence of a particular tool or portion thereof in an automated machine, thereby providing the capability to detect breakage of or other problems with such a tool during the course of an automated operation. Due to the invention's ability to accurately and repeatedly detect a moving object even in the least conducive environments, it is ideal for industrial applications.

One preferred use of the noncontact laser based detection system is to detect the presence of a drill bit tip on an automated drilling machine. Large fluctuating electronic signals are produced by projecting a laser beam near the tip of the drill bit and collecting the light reflected by the concave surface of the drill bit flute with a photodetector. Since the sensor can be mounted in and as part of the pressure foot of the drilling machine, the presence of the drill bit tip may be verified after each drilling stroke. Also, by projecting and sensing the reflected light at an angle oblique to the drill axis of revolution, increased drilling machine throughput and greater immunity to dust and debris may be realized.

As discussed in more detail below, when used to detect broken drill bits, the light from a laser diode is projected and focused onto a rotating drill bit in the form of either a stripe of light or a spot of light. The light is then reflected from the concave flutes of the drill bit and is collected by a receiver lens. The reflected light is optically filtered to eliminate light outside the desired wavelengths and is then detected by a photodetector. After the detected light signal is converted to an electrical signal, any DC and unwanted AC components can be electrically filtered out of the electrical signal and the signal level can be compared to a threshold voltage level. Each time the photodetector senses light reflected from the drill, with sufficient signal strength to exceed the threshold voltage, signifying the presence of the drill bit, a sensor output signal to the drilling machine host computer changes state to signify the continuing presence of a drill bit. After a period of time, which should include at least one revolution of the drill bit, if the host machine does not receive at least one signal that the drill bit has been detected, then it is likely that the tip of the drill bit or the drill bit itself has been broken. The drilling machine is then shut down so that the damaged drill does not damage the circuit board or the system produce a partially drilled board.

It is an object of the invention to automatically detect a broken tip on a drill bit.

It is an object of the invention to monitor the continuous presence of a rotating drill bit and to provide an indication when the drill bit is broken or absent.

It is an object of the invention to detect laser light reflected from the object in continuous repetitive motion, by detecting laser light, the presence of which changes at a frequency which directly relates to the frequency of the continuous repetitive movement.

It is an object of the invention to provide a robust noncontact sensing system to monitor the presence and conditions of drill bits used in an automated drilling machine.

It is an object of the invention to provide a distinct large fractional signal change to indicate the presence or absence of a drill bit.

It is an object of the invention to provide a drill bit detector which can be positioned above the drill tip to rapidly detect the presence of a drill bit near the surface being drilled without the necessity of substantially withdrawing the drill bit from the surface for purposes of detection.

The systems immunity to environmental conditions and host system designs, its flexibility as to location and object being detected, combined with its quickness and accuracy, creates a widely applicable and inexpensive solution for many detection applications. These and other features, objects and advantages of the invention will become obvious to those skilled in the art upon review of the following description of the preferred embodiment, the appended drawings and claims appended hereto.

BRIEF DESCRIPTION OF THE DRAWINGS

FIG. 2, is a cutaway side view of the pressure foot assembly taken along the line 2—2 in FIG. 1.

DESCRIPTION OF THE PREFERRED EMBODIMENT

Figure 1:
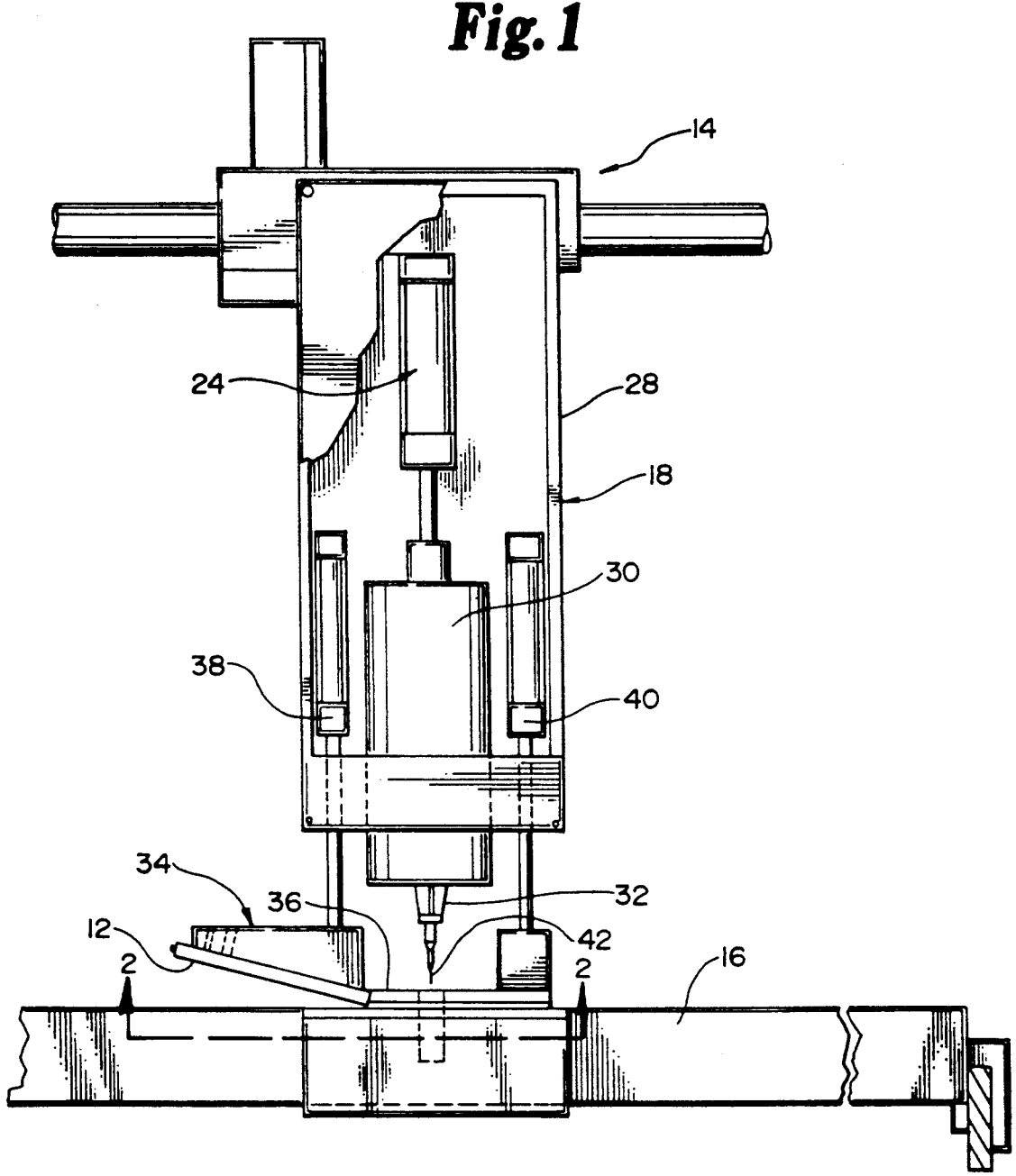
FIG. 1 is a fragmentary, front elevational view of an automated circuit board drilling machine having a laser based detection system in accordance with the present invention mounted thereon.

Referring generally to the drawings, FIG. 1 shows a drilling machine 14 for drilling holes 52 in circuit boards 44. The automated drilling of holes 52 in circuit boards 44 is typically accomplished by mounting the circuit board 44 to a servo motor driven worktable 16 of an automated circuit board drilling machine 14 which is controlled by a host computer (not shown). Examples of such machines are the CONCEPT IV drilling and routing systems by Excellon Automation of Torrance, Calif. The circuit board 44 is accurately positioned on a worktable 16 below a spindle assembly 18 which rotates a drill bit 42 at speeds varying from approximately 30,000 to 100,000 rpm. To eliminate any problems caused by warpage of the circuit board 44 during the drilling process, a pressure foot 34 applies a force of about sixty pounds on the circuit board 44 to ensure that good contact is maintained between the circuit board 44 and the worktable 16. The pressure foot 34 also contains a vacuum system to remove dust and debris generated by the action of the drill 42. The spindle assembly 18 and pressure foot 34 are lowered and the drill bit 42 creates a hole 52 in the circuit board 44. The entire drilling process is usually coordinated by the host computer and runs at speeds of about five holes 52 per second.

The processor controls such things as worktable 16 positioning, board feed rates, spindle assembly 18 rpm, automatic drill bit 42 changes and drill 42 diameter verification. The need for small pads, thin conductor lines, and narrow line spacings in printed circuit boards 44 requires automated circuit board drilling machines 14 to have the ability to drill numerous small to large high quality holes 52 of varying diameters ranging from 0.004 to 0.250 inches. Following the lowering of the drill bit 42 to create the circuit board hole 52, the drill bit 42 and pressure foot 34 are retracted and the circuit board 44 is repositioned so that the next hole 52 may be drilled.

Because the automated drilling machine 14 rapidly drills the necessary holes 52, at a rate of five per second, it is not possible for a person to visually inspect the tip of the tiny drill bit 42 to see if it has been broken or damaged and attempt to stop the machine 14. Therefore, automated noncontact methods have been developed, using microwaves and light occlusion to automatically check and react to broken and damaged drill bits 42.

Noncontact light detection systems have traditionally operated on the premise of projected light being occluded by the object desired to be detected and not by light reflection from the object. For a light occlusion system, the smaller the laser beam is with respect to the drill, the larger the fractional change in detected signal becomes. The problem with the LED based system is that the focused beam diameter is much larger than the smallest diameter drill. For the smaller diameters a very small fractional change in detected light must be sensed accurately. In a light occlusion system, any foreign objects in the path of the light will also block or occlude the beam and possibly give a false reading that the object is present. Occlusion systems are also based on a steady light signal. Steady state light detectors have been plagued by problems from dust, debris and other environmental conditions. A system which detects fluctuating light, such as that described in connection with the present invention eliminates nearly all interference from dust, debris and ambient light.

Noncontact microwave detection systems operate on the principle that the presence of a continuous target, such as a fine drill bit 42, in or near the end of a microwave waveguide at a predetermined location produces a change in the standing wave ratio (SWR) of the transmitted signal. This change in the SWR is capable of being detected by a receiver to provide a signal that is indicative of the target condition. The creation of a resonant microwave cavity and the detection of objects entering the cavity by a change in the standing wave ratio is effected by nearly any metal object entering the resonant cavity or by variations in the shape of the cavity. Thus, the system is prone to interference from debris. The microwave detection systems are also subject to interference from the copper shavings produced during the drilling of the copper layers in printed circuit boards 44, a condition known as "drill-wrap," and many system variations. The microwave system is sensitive to precisely the target, the exact drill diameter, that is being detected. Thus in drilling systems, the detection device must be recalibrated for each drill bit 42 diameter. This can be highly inefficient for a drilling system 14 which engages drill bits 42 of varying diameters via an automatic changer.

Figure 3A:
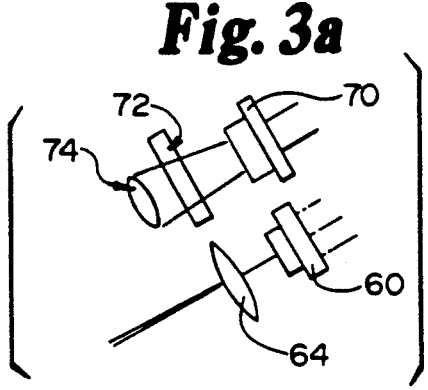
FIG. 3a is a top schematic view of the optical components of the invention taken along the line 3—3 in FIG. 3.
Figure 3:
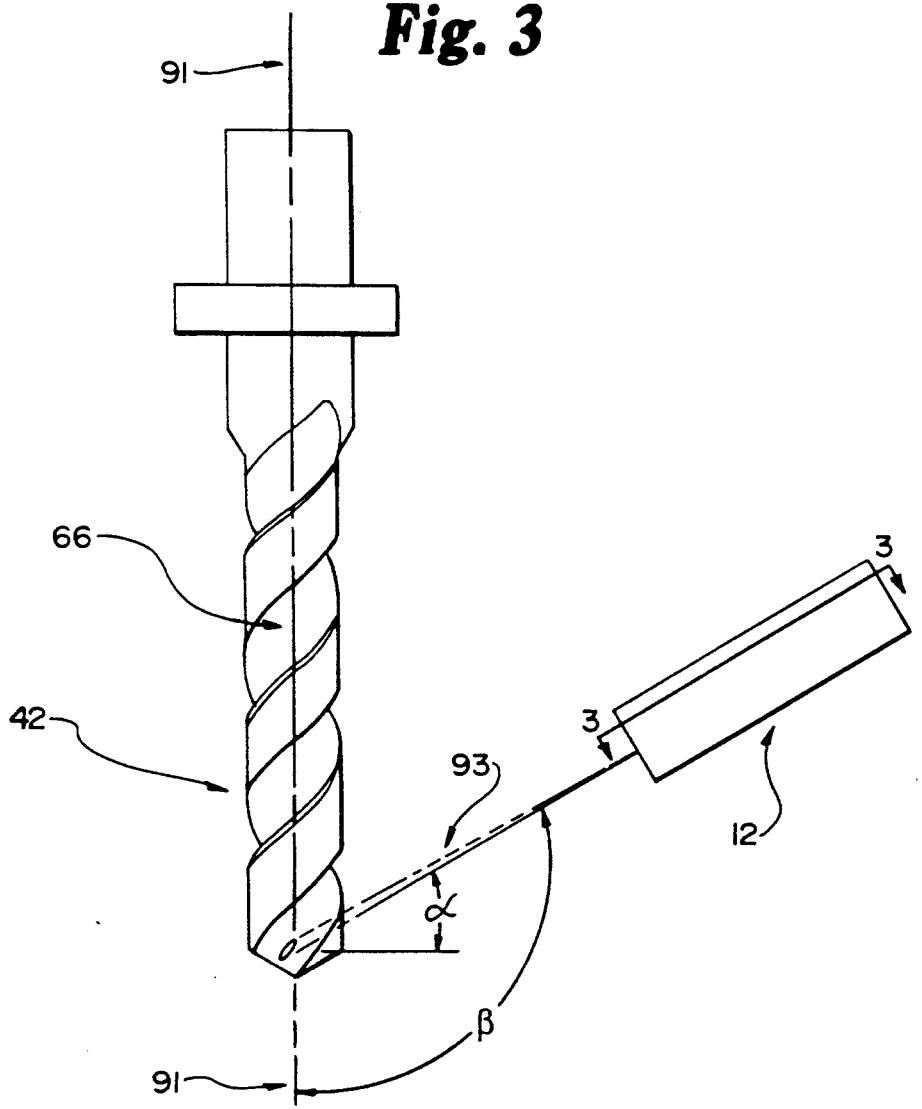
FIG. 3 is a schematic diagram depicting a drill bit and the laser sensor.

As shown in FIGS. 1 and 3 and other drawings, the present invention uses a laser detection sensor 12 to monitor the condition of the tip of the drill bit. The use of a laser 60 instead of a traditional light source greatly increases the sensitivity and accuracy of the detection system. Traditional light detection systems have smaller fractional signal changes from the object-present state to the object-not-present state than the present invention. Utilizing an LED light source detector on drill bit 42 diameters ranging from 0.004 to 0.250 inches, the light will be only partially occluded by the finer drill bits 42. Therefore, use of this method requires differentiation between small fractional signal changes from the object-present state to the object-not-present state. A laser 60 is able to produce a more intense concentration of energy in the region of the drill tip than either an LED or a microwave device. Use of a laser 60 beam focused on a particular point of the moving object such as the tip of the drill bit 42, which reflects a signal back to the detector if the drill bit tip is present, but does not if the drill bit is gone, greatly assists in producing a large ratio of signal change from the object-present to the object-not-present state. Environmental conditions are not likely to occlude the laser light and will not cause an oscillating light reflection similar to that produced by the drill bit 42. A greater fractional signal change helps to enhance accuracy and to reduce possible interference. The present invention's combined use of focused laser light and a fluctuating light signal, allow the energy and the sensing means to be concentrated on the drill tip. Even if the light path is partly occluded, the signal ratio between the object-present state and object-not-present state remains greater than in other detection devices and is more detectable. In microwave detection devices, the drill tip plays only a small part in determining the resonant microwave field shape. Therefore, its absence or presence does not create a large fractional signal change and other items in the cavity may cause a confusingly similar signal change.

Referring more specifically to the embodiment shown in FIG. 1, sensor 12 for the noncontact laser detection of a drill bit 42 is depicted in conjunction with an automated circuit board drilling machine 14. The drilling machine 14 broadly includes a worktable 16 which can accommodate a plurality of circuit boards 44 to be drilled, a spindle assembly 18, and drill vertical positioning motor and leadscrew assembly 24. A control module (not shown) includes the electronic circuitry for precise three dimensional positioning of the drill bit 42 in relation to the worktable 16, and error control circuitry halting the drilling process when an error is detected by the sensor. The drill includes drill case 28, spindle 30, chuck 32, drill bit 42, and board press 34. The board press 34 includes pressure plate 36 and pressure bearing piston and cylinder assemblies 38, 40. A detachable drill bit 42 is carried by the drill chuck 32. The drill vertical positioning piston and cylinder assembly 24 retracts the drill bit 42 after a hole has been drilled.

The drilling sequence starts by loading a drill bit 42 of a certain diameter in the drill chuck 32. The drilling machine 14 then proceeds to drill a number of holes 52 in the circuit board 44 at various locations on the board. Upon completion of this operation, another drill bit 42 of possibly different diameter is loaded in the chuck 32 and the process is repeated until all holes 52 are drilled in the circuit board 44. Problems arise when the drill bit 42 either breaks or is missing during the drilling operation.

Figure 1A:
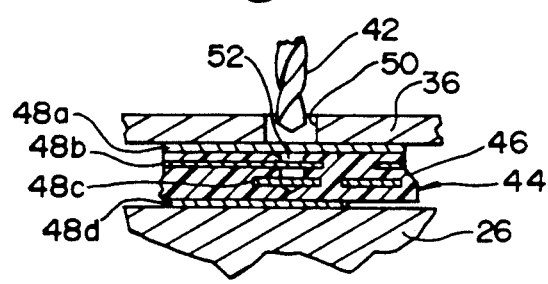
FIG. 1(a) is an enlarged, fragmentary view of a printed circuit board mounted on an automated circuit board drilling machine with a hole drilled into the board.

Referring to FIG. 1a, a printed circuit board 44 is shown positioned between the upper surface of worktable 16 and pressure plate 36. The printed circuit board 44 includes electrically nonconducting substrate 46 and a plurality of conducting lines 48 positioned within the substrate 46 in a plurality of conducting layers 48a, 48b, 48c, 48d. The drill bit 42 is depicted in FIG. 1a as being withdrawn from drill bit passage aperture 50 of pressure plate 36 after drilling a hole at 52 to connect conducting layers 48a, 48b, 48c.

FIG. 2 shows the pressure foot assembly 34 in more detail including the laser detection system 12. The laser detection system 12 is positioned such that a projected laser beam is in direct line of sight with the drill bit tip 42 when the drill bit tip 42 has completed drilling and has been minimally retracted into the pressure foot assembly 34. By mounting the sensor 12 inside the pressure foot 34 and projecting the laser beam near the tip of the drill bit 42, the presence of the drill tip may be verified after each drilling stroke.

As shown in FIGS. 2 and 3, the preferred detection system minimizes the distance required for the drill bit 42 to be retracted by projecting the laser beam 93 down the axis of rotation 91 forming an angle $\alpha$ that is approximately 25 degrees above a normal to the axis 91, thus being positioned at an oblique angle $\beta$ to the axis 91 of the drill 18. It is preferred that the angle $\beta$ be over 90 degrees from the axis to about 120 degrees. Hence, increased drilling machine throughput is obtained by projecting the laser beam 93 and sensing the reflected light at an angle $\beta$ oblique to the drill axis of revolution 91. When the drill assembly 18 retracts as shown in FIG. 1a, debris and copper shavings produced during drilling enter the pressure foot cavity. Projection at normal incidence, as was done with past designs, complicates vacuum design since the optics would then be located in a direct ballistic path of the debris generated by the drill bit 42.

Positioning dowels 80 and 82 which provide alignment for the sensor are located inside the pressure foot assembly 34 and 86 which hold the detection device 12 in place are located at the top of the pressure foot assembly 34. Light pathways 88 and 90 are machined through the pressure foot 34 and provide the light source 60 and photodetector 70 direct line of sight to the drill bit 42.

The laser diode 60, lenses, filters, and sensor head electronics are housed in a mechanical mount which serves as the sensor body 12. The sensor body may be an integral part of the drilling machine pressure foot 34 or a modular unit mounted in the pressure foot 34.

FIG. 3 is a schematic representation showing the drill 42 and the sensor 12 in more detail. As shown in FIGS. 3 and 3a, focusing optics take the output of a laser diode 60 and project light onto the drill bit 42. The light from a laser diode 60, is projected through stripe projecting optics 64 and onto the drill bit 42.

Utilizing a focused laser 60 also allows the light source to be located further from the object giving greater immunity to environmental conditions and greater flexibili in machine design. The focused laser light 60 reflects off the concave flute surfaces 66 of the drill bit 42. The utilization of the concave surface of the drill bit flutes 66 also assists in enabling it to be more conveniently located or moved. The ability to locate the sensor 12 away from the object in motion and away from a ballistic debris path makes the sensor less susceptible to environmental interferences. The reflected light is then collected and collimated by a receiving lens 74, filtered by an optical filter 72, and collected by a solid state photodetector 70. The optical filter 72 blocks ambient visible illumination from reaching the detector 70 while allowing the near-infrared light from the laser diode 60 to be collected by the detector 70. A cable 78 is also connected to the sensor 12 allowing various electrical signals to be sent and received by the sensor 12. One of the signals which travels on cable 78 is the beam detect signal. An electronic signal or bit is generated each time a drill bit flute 66 is detected. The drill bit 42 is considered broken or absent when the beam detect signal does not change states for a period of time which comprises at least one complete drill 18 revolution.

In order to accommodate a wide range of drill bit 42 diameters, the sensor 12 optics may project a stripe of light onto the drill bit 42. This will ensure that there will be at least one point per flute 66 on all drill bits 42 which will reflect light back to the photodetector 70. Optical alignment is also less critical when using a stripe of light. To generate a stripe of light, the focusing optics 64 may incorporate cylindrical or toric elements. Stripe projection dimensions of approximately 0.002 inches in height and 0.020 inches in width appear preferable. For a fixed laser diode 60 output, the larger the stripe the lower the optical power density at the point of best reflection on the drill bit 42. This results in less received optical signal at the detector 70. The optical power density at a point in the stripe will be lower than it would be for a spot of light.

When light is projected at an angle normal to the drill axis, the laser beam is preferably focused at or about the drill axis. When the light is projected at an oblique angle $\beta$ with respect to the drill 18 axis of revolution, which is a preferred embodiment, the photodetector 70 receives the largest signal when the light is reflected from a point on the concave drill bit 42 flute surface 66 which is slightly off the drill 42 axis. The best reflection point is a function of the laser beam projection angle, the drill bit 42 helix angle, and the diameter of the drill bit 42. For a fixed drill bit 42 helix angle and a fixed laser beam projection angle, the best reflection point is further away from the drill bit 42 axis for large diameter drill bits 42 than it is for smaller diameter drill bits 42.

A large fluctuating signal is thus produced as the drill bit 42 rotates. The laser beam is reflected from each of the two flute surfaces 66 of the rotating drill 42 to the detector 70, giving an oscillating signal whose frequency is directly related to the frequency of rotation of the drill bit 42. Thus, the presence of the oscillating signal of laser light, at the predetermined frequency, can be sensed. Other frequencies, including DC or ambient light, can be optically and electronically filtered as described below. The absence of such a signal, of course, means the tip of the drill bit 42 has been broken or damaged.

Figure 4:
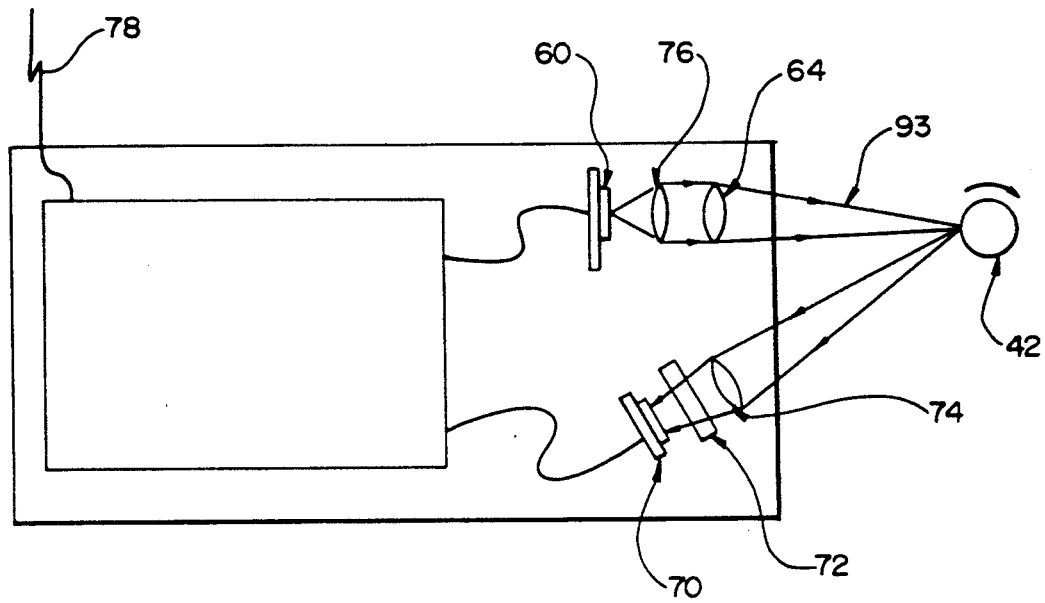
FIG. 4 is a top schematic view of the major components of the invention.

The laser diode 60, lenses 64, 74, lens filters 72, and sensor head electronics are housed in a mechanical mount which serves as the sensor body 12 as shown in FIG. 4. FIG. 4 schematically shows the details of the sensor body 12 and its relation to the drill bit 42. The sensor body 12 houses the optics including the laser diode 60, source lens 76, stripe projecting optics 64, photodetector 70, optical filter 72, and receiver lens 74. The sensor body 12 also houses the electronics of FIG. 5 and 6. A cable 78 is connected to the sensor 12 allowing various electrical signals to be sent and received by the sensor 12 and allowing for a connection to a host machine computer.

As is shown in FIG. 4, the lenses are not projecting and receiving in parallel paths to each other but form an angle. This angle can range from 0 to 90 degrees when the lenses are in the same horizontal plane. The source lens 76 and stripe projecting optics 64 shown in FIG. 4, may be combined into a single toric shaped optical element.

Figure 5:
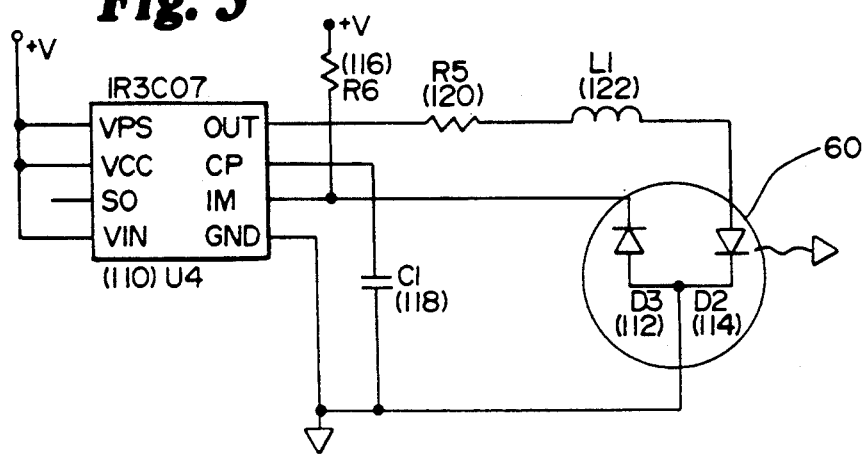
FIG. 5 is a schematic of the sensor electronics controlling the output of the laser diode.
Figure 6:
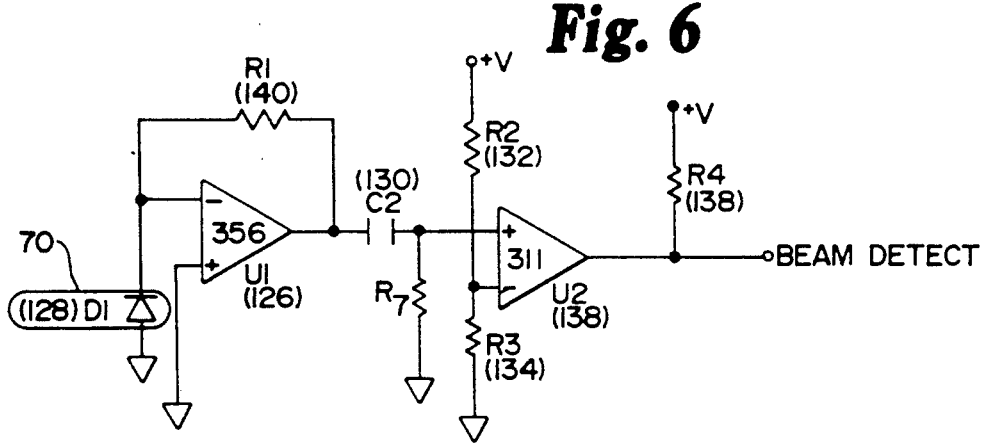
FIG. 6 is a schematic of the sensor electronics which amplify the output of the photodetector and produce a beam detect signal when the presence of a drill bit is sensed.

The sensor electronics shown in FIGS. 5 and 6 control the laser 60 power, amplify the output of the photodetector 70, and produce the beam detect signal when the presence of a drill bit 42 is sensed.

The integrated circuit 110 in FIG. 5 controls the output power of the laser diode 60. The output of photodiode 112, which is packaged with laser diode 114, is used as feedback to the integrated circuit 110 to maintain constant optical power. The programming resistor 116 adjusts the output power of laser diode 114.

FIG. 6 shows the electronics which convert the light falling on the photodetector 70 to a signal that the drill bit 42 was sensed. A transimpedance amplifier, 126 is used to generate a voltage proportional to the amount of light falling on photodetector diode 128. The blocking capacitor 130 allows only fluctuating voltage signals to be applied to the input of comparator 136. When the level of this fluctuating voltage exceeds the threshold voltage level established by the voltage divider network of resistors 132 and 134, the output of the comparator 136, indicates that a drill bit was sensed. The output of comparator 136 is sent to the drilling machine host computer so that if the output of comparator 136 indicates that a drill bit 42 has not been detected, corrective action may be taken.

In a more elaborate implementation, the signal can be processed in a detector that is coherent to the frequency of rotation. If the drill bit's 42 frequency of rotation is known, for example from an electrical feedback mechanism attached to the spindle assembly 18 (such as a tachometer), an adjustable electronic filter can be implemented such that the detector looks for signals only around a narrow band of frequencies centered at twice the drill bit's 42 frequency of rotation, for a drill bit 42 having two opposing flutes 66. This has the effect of reducing the electrical noise bandwidth and hence increasing the electrical signal-to-noise ratio.

Since the laser source 60 can concentrate a large amount of energy on a small area of the drill tip, large fractional signal changes occur at the detector 70 when a drill tip breaks. Also, because the detector 70 output is electronically filtered such that only fluctuating (AC) signals are considered, the sensor 12 becomes immune to changes in the background light level.

The detection system 12 of the present invention is particularly useful because it is highly insensitive to outside energy, debris and abrasion which frequently interfere with the detection systems heretofore known in the art. The noncontact laser detection system 12 is particularly useful in combination with an automatic drilling machine 14 utilizing twist drills 42 which have a pair of helical cutting edges displaced by 180 degrees. The invention is usable in the same manner for a variety of drill bits 42 with concave flutes 66 such as those in which displacement of the cutting edge is not 180 degrees. The detection system 12 of the present invention can be readily constructed and retrofitted to an existing machine or added to the structure of a newly produced machine.

Distinct differences and advantages are achieved with the use of the laser sensor 12. The sensor 12 itself can be positioned at a remote location relative to drill 18 axis and at an oblique angle $\beta$. The energy from the sensor 12, however, can be concentrated near the tip of the drill bit 42 at or near the surface of the board 44 being drilled. Thus, the drill bit 42 need not be fully withdrawn into the pressure foot 34 as far as is required with LED and microwave designs. Since the sensor 12 senses reflected energy from the rotating drill bit 42 tip, a large fractional change is created—signal or no signal—rather than the small fractional proportional changes which must be detected with light occlusion, LED and microwave devices. Since the detected return signal frequency is an integer multiple of the rate of revolution 30,000–100,000 rpm, dust, debris, ambient light, and laser energy which does not strike the drill bit 42, does not adversely affect the detection since it is not returned in the frequency range of interest. Thus, the condition of the drill 42 tip can be accurately assessed near the surface after each drill 18 stroke and before the next drill 18 stroke so that corrective action can be taken before the circuit board 44 being drilled is damaged.

Having described a preferred embodiment of our invention, it will be apparent to those skilled in the art that it will have many applications. For example, it can be used in a similar manner to detect problems with any machine member which oscillates upwardly and downwardly in a single plane by sensing and detecting a reflected light beam which reflects off the surface of the member in a frequency related to the frequency of oscillations. Also, when detecting movement of non-reflective surfaces, a reflective tape can be used and the laser beam focused to detect reflections from the reflective tape. All such modifications and variations are intended to be within the scope of the appended claims.

We claim:

1. A sensor for detecting the presence of an object in continuous repetitive motion about an axis, comprising:
   a single energy source remotely positioned from the object and at an oblique angle to the axis of continuous motion;
   means for focusing the energy from said single energy source into a single beam concentrated directly onto a reflective portion of a surface of the object;
   means for sensing energy that is generated by said single energy source and reflected directly from said reflective surface of the object and for converting the sensed energy into electric signals, said energy sensing means remotely positioned from the object and at an oblique angle to the axis of continuous repetitive motion; and
   means, connected to the energy sensing means, for detecting fluctuating electrical signals that fluctuate at the frequency at which energy is reflected from the object, which is directly related to the frequency of the continuous repetitive motion, comprising:
      means for filtering the electrical signal to eliminate electrical signals that do not fluctuate and pass the electrical signals whose frequency of fluctuation is directly related to the frequency of the continuous repetitive motion; and
      means for determining the presence of an object in continuous repetitive motion, comprising:
         means for analyzing fluctuating electrical signals.

2. The sensor of claim 1 wherein the detecting means further comprises data processing means for converting the electrical signals into data and for collecting the data over a predetermined period of time to determine the continuous presence of fluctuating electrical signals having a frequency which is directly related to the frequency of the continuous repetitive motion.

3. The sensor of claim 2 wherein the detecting means further comprises:
   means for determining a baseline measurement by said sensing means to sense the energy falling on the sensing means and converted into electrical signals in the absence of said object; and
   means for comparing energy sensed and converted into electrical signals by the sensing means to the baseline measurement for ascertaining when the electrical signals are a predetermined level higher than the baseline measurement because of the reflection of the energy from the moving object.

4. The sensor of claim 3 wherein the detecting means further comprises a connection to a host computer to indicate when the energy sensed and converted by the sensing means is a predetermined level higher than the baseline measurement.

5. The sensor of claim 1 wherein said detecting means detects fluctuating electrical signals having the same frequency as the frequency of the continuous repetitive motion.

6. The sensor of claim 1 wherein the detecting means detects fluctuating electrical signals having twice the frequency of the object's continuous repetitive motion.

7. The sensor of claim 1 wherein said detecting means detects fluctuating electrical signals having a frequency which is a multiple integer of the frequency of the continuous repetitive motion.

8. The sensor of claim 1 wherein said energy source comprises a light source.

9. A sensor for detecting the presence of a rotating object having an axis of rotation, comprising:
   a single light source remotely positioned away from the rotating object and at an oblique angle to the axis of rotation of the rotating object;
   means for focusing the light emitted by the light source on the rotating object;
   sensing means remotely positioned away from the rotating object and at an oblique angle to the axis of rotation of the rotating object for sensing light reflected from the object; and
   means for detecting light that is reflected from the rotating object that is intermittently detected at a frequency that is directly related to the frequency of rotation of the object.

10. The sensor of claim 9 wherein said light source comprises a laser diode.

11. The sensor of claim 9 wherein the means for sensing light comprises a photodetector and where the means for detecting the reflected light comprises an optical lens to focus the reflected light onto the photodetector.

12. The sensor of claim 9 wherein the means for sensing the reflected light comprises an optical filter to minimize ambient light of any other energy not reflected from said object in continuous motion.

13. The sensor of claim 9 wherein the sensor is positioned at an oblique angle of over 90 degrees to about 120 degrees from the axis of rotation.

14. The invention of claim 9 wherein the light source comprises a means for generating a laser beam and wherein the means of focusing the light comprises means to focus the laser beam to a predetermined focal point.

15. The invention of claim 9 wherein the means for sensing the reflected light comprises a means for focusing the reflected light.

16. The sensor of claim 9 wherein the focusing means comprises means to focus a stripe of light which intersects the axis of rotation.

17. The sensor of claim 9 wherein the focusing means comprises means for concentrating the light at a point which is on the axis of rotation.

18. The sensor of claim 9 wherein the focusing means comprises means for concentrating the light at a point which is offset from the axis of rotation.

19. The sensor of claim 9 wherein the rotating object further comprises a reflective means applied to the rotating object and wherein the means for focusing light comprises means for concentrating the light to a focal point which intersects the reflective means on the rotating object.

20. The sensor of claim 9, wherein the detecting means further comprises means for converting the electrical signals into data and for collecting the data over a predetermined period of time to determine the continuous presence of fluctuating electrical signals having a frequency that is directly related to the frequency of the continuous repetitive motion.

21. The sensor of claim 20, wherein the detecting means further comprises:
   means for determining a baseline measurement by said sensing means to sense the energy falling on the sensing means and converted into electrical signals in the absence of said object; and
   means for comparing energy sensed and converted into electrical signals by the sensing means to the baseline measurement for ascertaining when the electrical signals are a predetermined level higher than the baseline measurement because of the reflection of the energy from the moving object.

22. The sensor of claim 21, wherein the detecting means further comprises a connection to a computer to indicate when the energy sensed and converted by the sensing means is a predetermined level higher than the baseline measurement.
   means for focusing the light emitted by the light source on the rotating object;
   sensing means remotely positioned away from the rotating object and at an oblique angle to the axis of rotation of the rotating object for sensing light reflected from the object; and
   means for detecting light that is reflected from the rotating object that is intermittently detected at a frequency that is directly related to the frequency of rotation of the object.

23. A sensor for detecting the absence of a rotating drill bit having flutes, comprising:
   a single laser light source for generating laser light;
   means for focusing the laser light on the rotating drill bit, wherein said focusing means concentrates the laser light at or near the tip of the drill bit, enabling the evaluation of said tip of the drill bit at or near the surface of the material being drilled;
   means for sensing light reflected from the flutes of the rotating drill bit; and
   signal means connected to the sensing means for indicating the presence of the drill bit.

24. The sensor of claim 23, wherein the sensor is positioned remotely from the drill bit and at an oblique angle from the axis of rotation.

25. The sensor of claim 23 wherein the sensor further comprises:
  means for determining the frequency of rotation of the rotating drill bit, and
  means for electronically filtering signals indicative of the reflected laser light, said electronic filter having a narrow bandwidth centered on a frequency which is directly related to the frequency of rotation.

26. The sensor of claim 25 wherein electronic filtering means comprises means for adjusting the bandwidth of the electronic filtering means so that small variations in drill speed can be accommodated.

27. The sensor of claim 25 wherein electronic filtering means comprises means for adjusting the center frequency of the electronic filtering means so that different frequencies of rotation can be detected by the detecting means.

28. The sensor of claim 23 wherein each drill bit comprises at least two spiral flutes having concave surfaces and wherein the sensing means detects reflected light from the concave surfaces of the flutes of the drill bit.

29. The sensor of claim 23 further comprising second signal means having at least one input and one output and wherein the first signal means indicating the presence of the drill bit is connected to the input and wherein when the first signal means no longer indicates the presence of a drill bit, the output of the second signal means creates an electronic signal indicating that the drill bit is not present.

30. The sensor of claim 23 wherein the means of focusing laser light comprises means for focusing a stripe of light which intersects and crosses the axis of rotation and wherein the strongest signal is focused at a point which is offset from the center of rotation.

31. A sensor for detecting the presence of a rotating drill bit having a tip and at least one flute, comprising:
  a single energy source remotely positioned away from the drill bit and positioned at an oblique angle to the axis of rotation of the drill bit;
  means for focusing the energy from said energy source at or near the tip of the rotating drill bit when said rotating drill bit is positioned adjacent to an item intended to be drilled, enabling the condition of the tip of the drill bit to be evaluated at or near the surface of the item;
  means for sensing energy reflected from said flute of the rotating drill bit, said energy sensing means positioned at the substantially same oblique angle to the axis of rotation of the rotating drill bit; and
  first signal means connected to the energy sensing means for indicating the presence of said rotating drill bit.

32. The sensor of claim 31, wherein said drill bit includes two spiral flutes, each flute having a concave surface, and wherein the energy sensing means detects reflected energy from said concave surfaces of the drill bit.

33. The sensor of claim 31, further comprising means for determining the frequency of rotation of the rotating drill bit connected to said energy sensing means.

34. The sensor of claim 33, further comprising means for electronically filtering signals indicative of the reflected laser light, said electronic filter having a narrow bandwidth centered on a frequency that is directly related to the frequency of rotation.

35. The sensor of claim 34, wherein the electronic filtering means comprises means for adjusting the bandwidth so that small variations in drill speed can be accommodated.

36. The sensor of claim 35, wherein the electronic filtering means comprises means for adjusting the center frequency of the electronic filtering means so that different frequencies of rotation can be detected by the detecting means.

* * * * *